(12) United States Patent
Tan

(10) Patent No.: US 7,213,868 B1
(45) Date of Patent: May 8, 2007

(54) EASY DEPLOYMENT AND STORAGE AUTOMOBILE PROTECTION COVER

(75) Inventor: Yong-Jun Tan, School of Materials Science and Engineering, Nanyang Technological University, Singapore (SG)

(73) Assignee: Yong-Jun Tan, Melbourne, Victoria (AU)

( * ) Notice: Subject to any disclaimer, the term of this patent is extended or adjusted under 35 U.S.C. 154(b) by 184 days.

(21) Appl. No.: 11/127,071

(22) Filed: May 12, 2005

(51) Int. Cl.
*B60J 7/20* (2006.01)
(52) U.S. Cl. .................................. 296/136.04
(58) Field of Classification Search ........... 296/136.01, 296/136.04, 136.07, 136.1; 150/166
See application file for complete search history.

(56) References Cited

U.S. PATENT DOCUMENTS

| 4,596,418 A | 6/1986 | Koh |
| 4,718,711 A | 1/1988 | Rabbit |
| 4,825,889 A | 5/1989 | Monteith |
| 4,925,234 A | 5/1990 | Park et al. |
| 5,029,933 A | 7/1991 | Gillem |
| 5,078,330 A | 1/1992 | Hall |
| 5,176,421 A | 1/1993 | Fasiska |
| 5,364,155 A | 11/1994 | Kuwahara et al. |
| 5,597,196 A | 1/1997 | Gibbs |
| 5,855,406 A | 1/1999 | Vargo |
| 5,915,399 A | 6/1999 | Yang |
| 6,092,857 A | 7/2000 | Rivas |

*Primary Examiner*—Joseph D. Pape

(57) ABSTRACT

The present invention provides a protective automobile cover apparatus that can be conveniently deployed or stored by one person in approximately one minute. The automobile cover apparatus provides improved storage, anchoring and deployment mechanisms. It includes two containers with a flexible cover sheet stowed in the first container in a free-folded form. The first container has a length similar to the width of the opening of the trunk and is stored in the second container in its storage position. In its operative position, the first container rests on the rear bumper and is anchored relative to the vehicle by straps caught by the second container which is secured inside the trunk compartment of the automobile. The user grasps a handle element to extract and display the cover sheet from the first container without the need of unfolding the cover. The user can also easily uncover the automobile and stuff the cover sheet into the first container, without the need of compactly folding the cover.

9 Claims, 4 Drawing Sheets

EASY DEPLOYMENT AND STORAGE AUTOMOBILE PROTECTION COVER

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC APPENDIX

Not Applicable

BACKGROUND OF THE INVENTION

1. Field of the Invention

The present invention relates to automobile accessories, and more particularly relates to an automobile protection cover that can be easily and quickly deployed and stored by user.

2. Description of the Related Art

Automobile cover is an effective means of protecting automobiles from metal corrosion, paint degradation and interior materials aging due to harmful effects of the environment such as corrosives, airborne contaminates, sunlight, ultraviolet rays, dew, rain, snow, bird dropping, tree sap and abrasive windblown sand. Automobile cover is also useful as a solar shield to keep the interior of an automobile cool in hot and sunny climates. Although the numerous benefits of using an automobile cover are well known and variously designed automobile covers are readily available in the market, use of automobile covers is in fact very limited and many car users choose to utilize window blind as a solar shield for partial protection of automobile interiors. This inventor believes that the fundamental reason that has affected the widespread, routine and daily usage of conventional automobile covers is the inconvenience of using such covers. A conventional automobile cover typically consists of a piece of flexible fabric that is shaped to surround an automobile body and that is folded and stored in the trunk of the automobile. The deployment of the cover requires the user to go through many steps such as unstowing the cover, locating the perimeter of the opening of the cover, positioning the cover over the automobile, and then securing the cover by fasteners or elastic materials and the like. The storage of the cover also requires the user to go through many steps such as removing the cover from a vehicle, folding the cover, packing it into a container, and thereafter storing the container. Typically it takes about ten minutes to deploy or store an automobile cover. Most automobile users find it troublesome and time consuming to utilize a conventional automobile cover, particularly when the cover is wet and soiled in a raining, snowy or windy day. Many users have experienced difficulties in deploying or storing an automobile cover alone and have to ask others for help. In addition, conventional car cover may be easily stolen by thief or be blown away by stiff wind.

The most common solution proposed to overcome these problems has been to store the flexible cover on variously designed wind-up rolls or similar devices using either manually operated or motor driven rolls. This type of roll is typically placed inside a container so that when the cover is wound on the roll, it resides within the container that is secured to the front, rear end or other parts of an automobile. The container may also be permanently mounted near or inside of the automobile bumper. From its rolled-up stored position the flexible car cover can be unrolled and pulled toward the opposite end of the car and operatively secured over the car. Examples of this type of 'roll-up' car cover can be found in U.S. Pat. Nos. 1,918,423; 3,222,102; 3,992,053; 4,432,581; 4,519,644; 4,657,298; 4,720,135; 4,727,898; 4,732,421; 4,856,824; 5,056,839; 5,078,330; 5,086,988; 5,176,421 and 5,597,196. A typical example of such roll-up car cover is disclosed in U.S. Pat. No. 5,078,330 that proposes a battery powered electric motor driven rewinding and storing apparatus for flexible vehicle covers. The device is stored in the trunk, and is pivoted out of the trunk and held in place on the bumper when in use. Its container is anchored to the rear bumper of the automobile using a pair of elastic straps and metal hooks. Another typical roll-up car cover is disclosed in U.S. Pat. No. 5,176,421 that teaches a flexible car cover having one end attached to a rotatable spool housed in a containment tube. The spool may be rotated by means of a pre-loaded spring, electric motor or manual crank. The tube is located in the trunk for storage, and is pivoted out of the trunk and towards the back bumper prior to applying the cover to the automobile. U.S. Pat. No. 5,597,196 provides another design that the car cover is wound around a roller assembly, which is stored in the trunk compartment of the automobile. The cover can be unwound from and wound back onto the roller with the assistance of the spring biased roller. In general, all these roll-up car cover designs have made some improvements to conventional car covers, however a critical deficiency of this type of cover system is that they utilize complex roller structures, which unfortunately often experience snagging or jamming problems when winding and unwinding the cover. The installation of such relatively heavy roller structures often requires that the vehicle itself be altered.

Another type of car cover design is based on various methods of anchoring flexible covers to automobile body, avoiding the use of wind-up rolls. Examples of this type of anchored car cover can be found in U.S. Pat. Nos. 4,596,418; 4,718,711; 4,799,728; 4,825,889; 4,925,234; 5,022,700; 5,029,933; 5,088,788; 5,188,417; 5,294,167; 5,364,155; 5,409,286; 5,855,406 and 6,092,857. Typical examples of such anchoring car cover are disclosed in U.S. Pat. Nos. 4,718,711 and 5,029,933 that describe car covers that are simply anchored to the interior trunk hinge by straps. The covers can be deployed by pulling out from the space between the hinges and stored by rolling up about itself like a bed-roll. U.S. Pat. No. 4,825,889 discloses a vehicle cover that uses flexible tie strips formed of an elastic cord with plastic coated hooks to anchor the cover sheet to the vehicle. U.S. Pat. No. 4,596,418 proposes to anchor the car cover through a string, a ring and hooks that are attached to the trunk and underside of the vehicle. U.S. Pat. No. 5,364,155 discloses a car cover that is anchored to automobile body using straps and hook-and-loop fasteners. U.S. Pat. No. 4,925,234 discloses a cover that is simply folded, accordion style, into the trunk. Closure of the trunk clamps a back end of the cover sheet in place to firmly anchor the cover sheet in place in its operative position. U.S. Pat. No. 6,092,857 discloses a car cover assembly that includes a duffle bag as the cover container, which is attached via two straps to an anchor pipe. The container is anchored to the automobile when the user drops the anchor pipe inside of the trunk and shut the trunk lid of the automobile, allowing the trunk lid to catch the anchor pipe. All these prior art designs have made some improvements to conventional car covers, however they still have problems for automobile covers being deployed and stored quickly and easily. Firstly, the anchoring mechanisms that disclosed in these prior arts have certain deficiencies. For instance, the method of anchoring a car cover with its container being attached to the hinges of the trunk via straps is cumbersome. The straps must stretch across the full width of the trunk and then be tied to the hinges of the trunk, and thus the straps may affect the storage function of the trunk. When the trunk lid is being closed or opened, the straps would draw the container up and down, causing the container to scratch the finish of the automobile body. The anchoring mechanism disclosed in U.S. Pat. No. 6,092,857 relies on the closed trunk lid to anchor the cover container through straps and a piece of anchor pipe. The user has to hold on the container whenever the trunk lid is open otherwise the container would drop to the ground, which is particularly troublesome if the ground is wet and soiled. Secondly, the prior art containers are not suitable for quick storage and deployment of covers since the opening of these containers are usually small and are usually made of flexible materials. For instance, the container utilized in U.S. Pat. No. 6,092,857 is approximately 20 inches long by 12 inches in diameter, which is much shorter than a median size cover that has approximate dimensions of 70 inches in width. Such a small container opening would require that the cover being compactly folded before it could be inserted into and stored within the container; and would also require the cover being unfolded before it could be deployed from the container. The flexible opening of the container also makes the folding and unfolding steps more time consuming and troublesome, especially when the cover is wet and soiled. Thirdly, the prior art designs often offer no mechanism of storing a wet cover in a raining or snowy day. This is a problem since a wet and soiled cover would dampen the trunk and thus cause inconvenience of storage.

This inventor believes that these deficiencies have seriously limited the widespread, routine and daily usage of automobile covers. The object of the present invention is to provide an improved automobile cover apparatus which eliminates or minimizes the disadvantages associated with prior art car cover designs.

BRIEF SUMMARY OF THE INVENTION

It is an object of the present invention to provide an improved automobile protective cover that can be conveniently deployed and stored by one person in about one minute.

It is a further object of the present invention to provide an improved automobile cover storage means consisting of two containers. The flexible cover sheet is stowed in the first container in a free-folded form. This avoids the need of compactly folding the cover and thus making cover storage quick and easy. The first container is stored in the second container, which is placed in the trunk of the automobile. The first container has a porous, net or mesh structure containing many holes at its bottom or on its sides. When the cover is wet in a raining or snowy day, water or snow on the free-folded cover sheet can drop through these holes and be collected in the second container for disposal. This helps drying the cover sheet and avoids wetting the trunk of the automobile in rain and snow weather conditions. The first container has a lengthening opening with a length similar to the width of the opening of the automobile trunk. The openings of the first and the second container are made of inflexible materials such as plastics, wood and metals. These features ensure easy and quick storage and also deployment of the cover.

It is a further object of the present invention to provide an improved automobile cover anchoring means that conveniently positions the automobile cover to its operative position.

It is a further object of the present invention to provide an improved automobile cover deployment means to easily extract the cover from the anchored container and cover it over the surface of an automobile. For the deployment of the cover, the first container is taken out from the trunk. In its operative position, the first container rests on the rear bumper and is anchored via straps to the second container which is secured inside the trunk compartment of the automobile. The user grasps the handle element to extract the cover from the anchored first container and pull the cover to correctly position the cover over the surface of the automobile. The handle element is secured under the front bumper region of the automobile using a lock device. The improved cover deployment means also includes the use of a weighted cover edges to help positioning the perimeter of the cover sheet and to prevent theft and strong wind.

For the uncovering of the automobile, the user can easily unlock and disengage the handle element from the automobile and then grasps the handle element and walks rearward along one side of the automobile. The cover sheet can then be easily collected and filled into the first container in a free form. The trunk is then opened, the first container dropped inside the second container, and the trunk closed.

BRIEF DESCRIPTION OF THE SEVERAL VIEWS OF THE DRAWINGS

The accompanying drawings, which are incorporated into and form a part of the disclosure, illustrate a preferred embodiment of the present invention and, together with the description, serve to explain the principles of the present invention.

DETAILED DESCRIPTION OF THE INVENTION

This present invention discloses an improved automobile cover that can be conveniently deployed and stored, allowing the user to cover or to uncover the automobile body in about one minute. Easy deployment and storage are achieved by providing an improved cover storage means, an improved anchoring means and an improved cover deployment means. In this disclosure, automobile refers to passenger vehicles including cars, jeeps and station wagons. Reference will now be made to the drawings.

Figure 1:
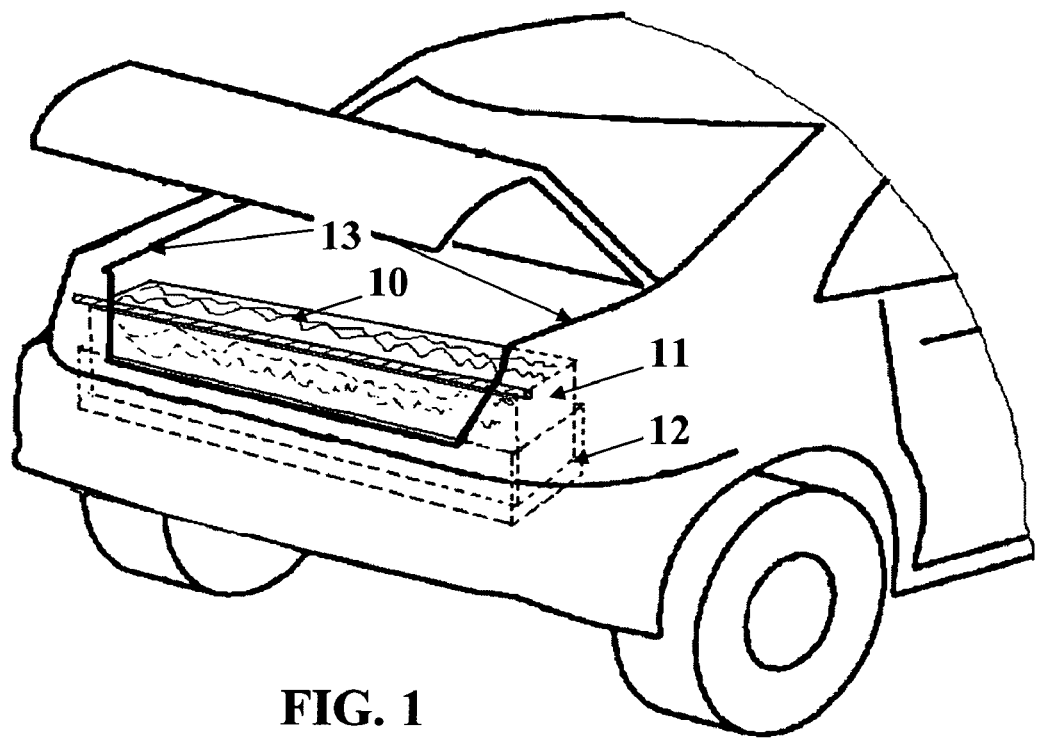
FIG. 1 is a schematic diagram illustrating an automobile cover apparatus being stored in a representative automobile in storage position.

FIG. 1 shows a schematic diagram illustrating the preferred embodiment of the automobile cover apparatus that includes an improved cover storage means. The flexible cover sheet 10 is stowed in the first container 11 in a free-folded form, avoiding the need of compactly folding the cover and thus making cover storage quick and easy. The first container 11 is stored in the second container 12, which is placed and secured in the trunk of the automobile. The first container has a porous, net or mesh structure containing many holes at its bottom or on its sides. When the cover is wet in a raining or snowy day, water or snow on the free-folded cover sheet 10 can drop through these holes and be collected in the second container 12 for disposal. This helps drying the cover sheet and avoids wetting the trunk of the automobile in rain and snow weather conditions. The first container 11 has a lengthening opening with a length similar to the width of the automobile's trunk opening 13. In one preferred embodiment, the first container 11 is approximately 140 cm long and is adapted to receive a median size cover sheet 10 which has an approximate dimension of 170 cm in width. The size and configuration of the automobile cover 10 in the first container 11 can vary depending upon the automobile to be covered without departing from the spirit of the present invention. The main structural materials for the first container are lightweight and strong materials such as plastics, aluminum, nylon, wood, reinforced cloths and waterproof paper. The openings of the first container should be made of inflexible materials such as plastics, wood and metals, although the body of the containers can be made of flexible materials such as cotton and nylon. Tests carried out in the inventor's workshop have proven that the length and the inflexibility of the opening the first container 11 ensured easy and quick storage and deployment of the cover.

Figure 2:
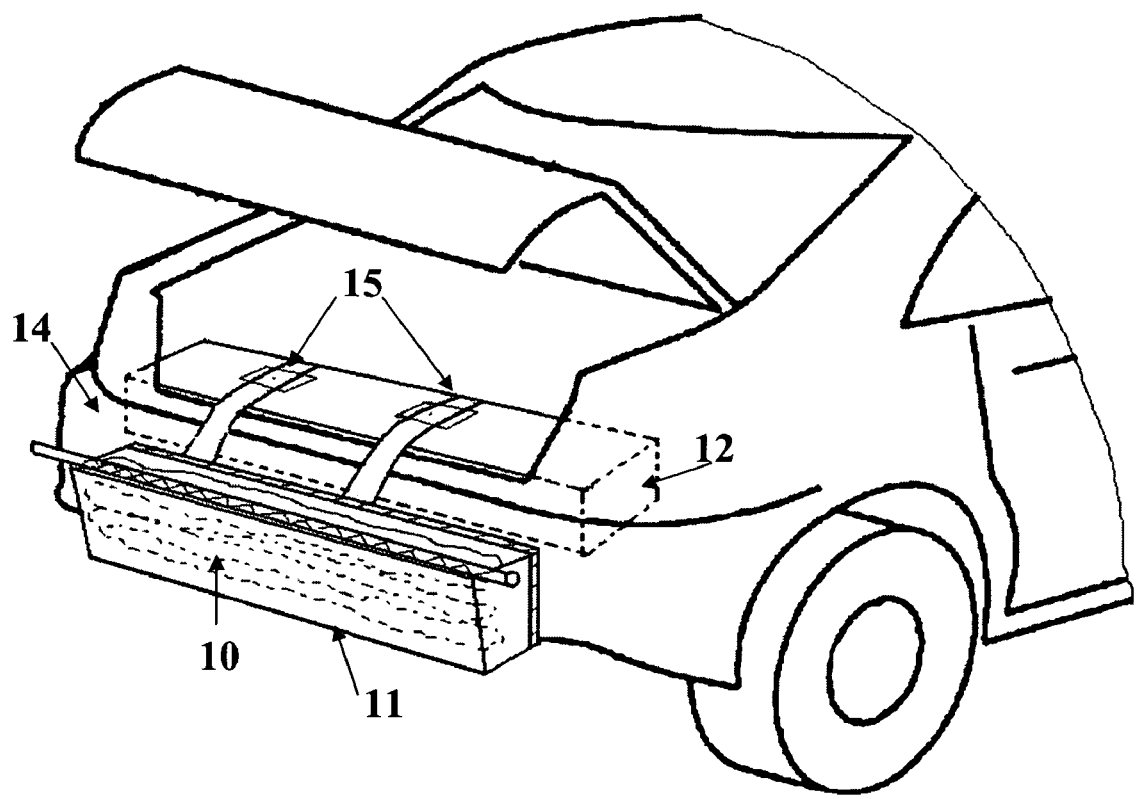
FIG. 2 is a schematic diagram illustrating an automobile cover apparatus being anchored to a representative automobile in operative position.
Figure 3:
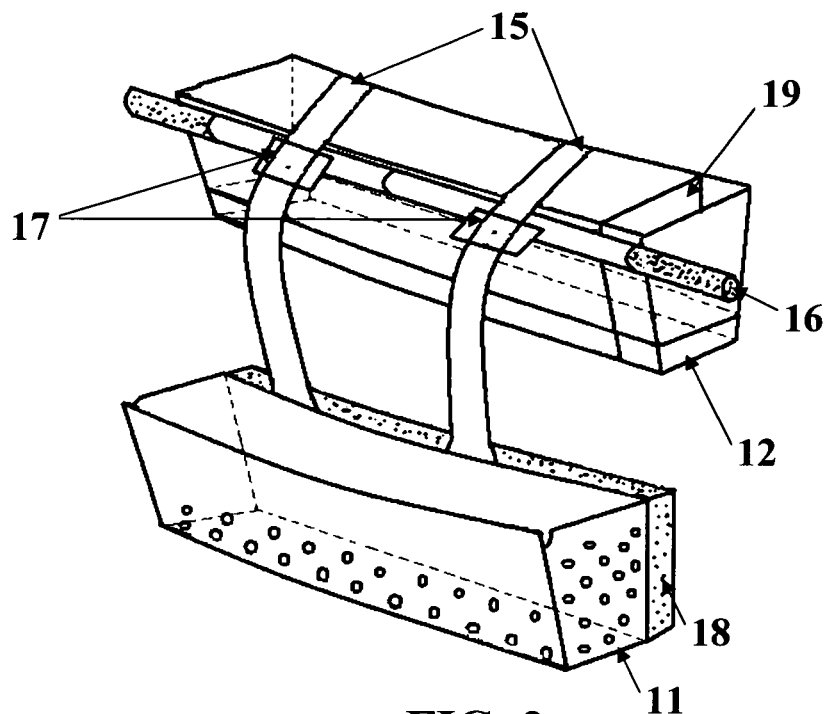
FIG. 3 is a schematic diagram illustrating the second container (inside the trunk) and the first container (outside the trunk) are connected via length-adjustable straps.
Figure 4:
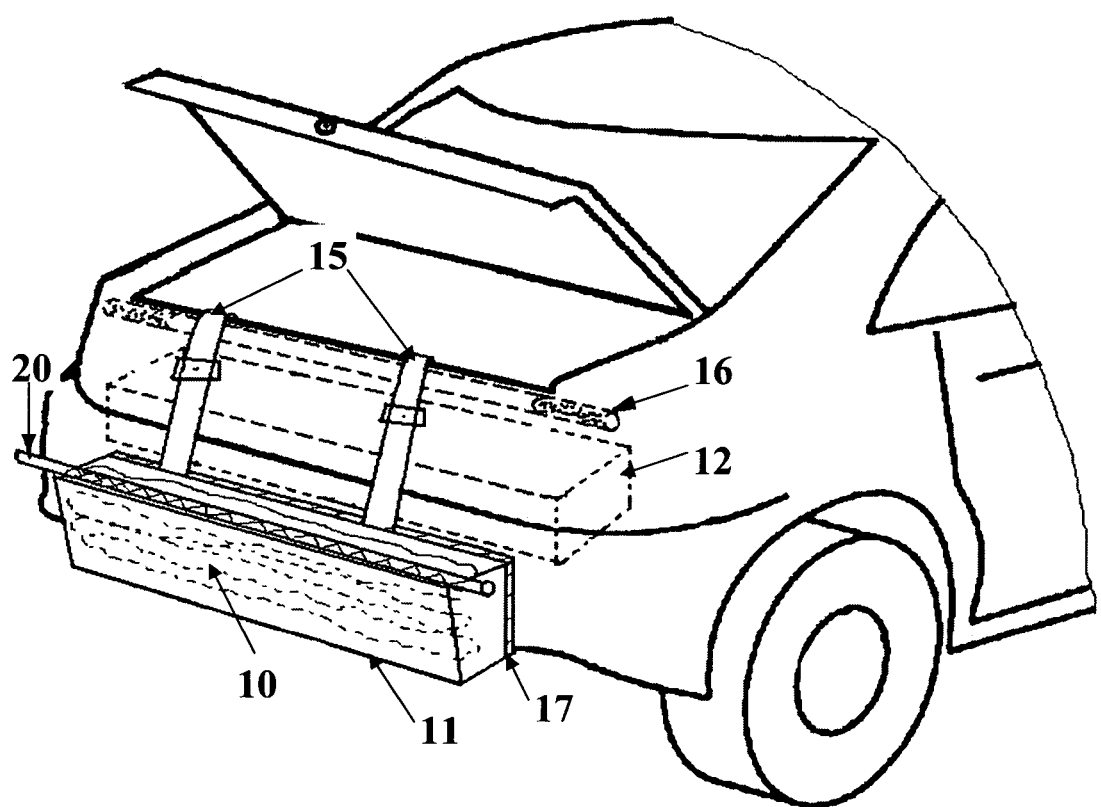
FIG. 4 is a schematic diagram illustrating an automobile cover apparatus being anchored to a representative automobile with a different trunk lid design, in operative position.

FIG. 2 shows that the first container 11 has been taken out from the trunk. In its operative position, the first container 11 rests on the rear bumper 14 of the automobile and is anchored relative to the vehicle by straps 15, which are caught by the second container 12. The second container 12 is secured inside the trunk compartment by anchoring to the edges of the trunk so as to anchor the first container 11, without the need of closing the trunk lid. FIG. 3 shows one preferred embodiment that a rod or a strip 16 is attached to the second container 12 to help stabilizing the second container 12 inside the trunk compartment of an automobile. The rod 16 is secured inside the trunk by anchoring to the edges of the trunk, without the need of closing the trunk lid. The length of the rod 16 and the straps 15 need adjustment only during the first time of use. The length of straps 15 can be adjusted using knots 17. The first container has a soft-side 18 that acts as a protective layer to prevent the first container 11 from damaging the finish of the automobile after the first container 11 touches the rear bumper 14 repeatedly. The protective layer can be sponge or other soft materials. This anchoring method does not need permanent modification to the automobile and does not take too much space of the trunk. In one preferred embodiment shown in FIG. 3, both the first and second containers are curved to best fit the shape of the automobile bumper. In one preferred embodiment shown in FIG. 3, the second container provides a space 19 that could be used to store surface coating repair and maintenance tools and materials kits to further fulfill the needs of automobile maintenance and protection. FIG. 4 is a schematic diagram illustrating an automobile cover apparatus being anchored to a representative automobile with a different trunk lid design, in operative position. The rod 16 is detached from the second container 12 and is used to anchor and secure the first container 11. The rod 16 is secured inside the trunk by anchoring to the edges of the trunk, without the need of closing the trunk lid. The handle element 20 is attached to the leading edge of the cover sheet to help extracting and deploying the cover from the first container 11.

Figure 5:
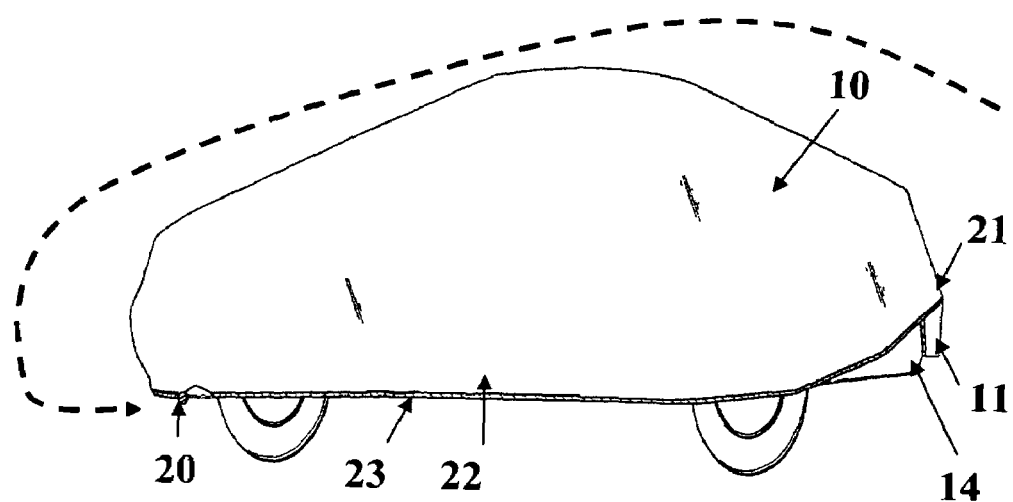
FIG. 5 is a schematic diagram illustrating an automobile cover apparatus being deployed to cover a representative automobile.
Figure 6:
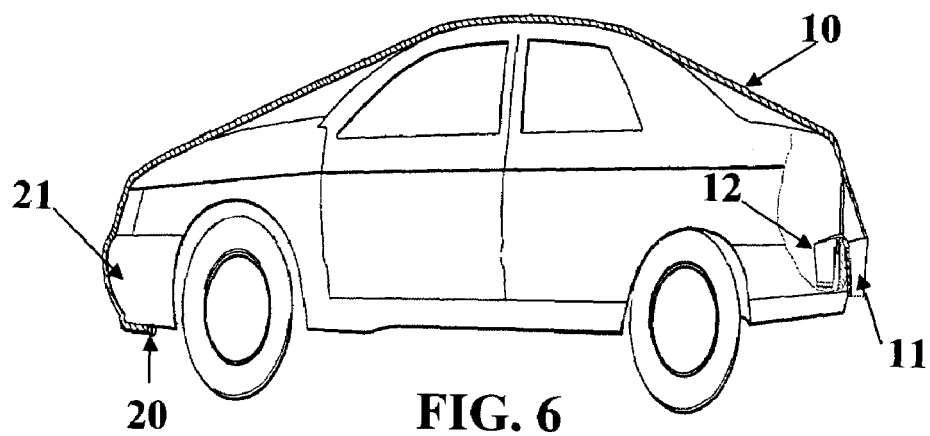
FIG. 6 is a perspective view showing an automobile cover apparatus being deployed to cover a representative automobile and a partial perspective view of the rear portion of the automobile.
Figure 7:
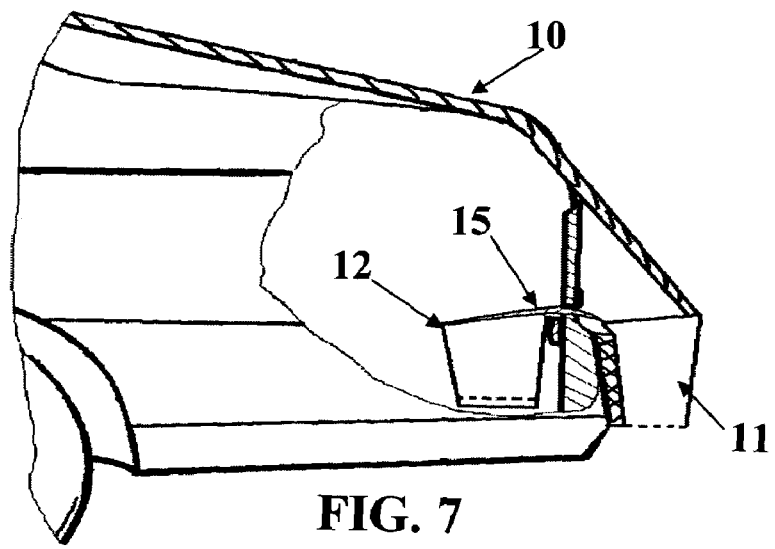
FIG. 7 is a partial perspective view of the rear portion of the automobile with the inside container and the anchored outside container of the present invention.
Figure 8:
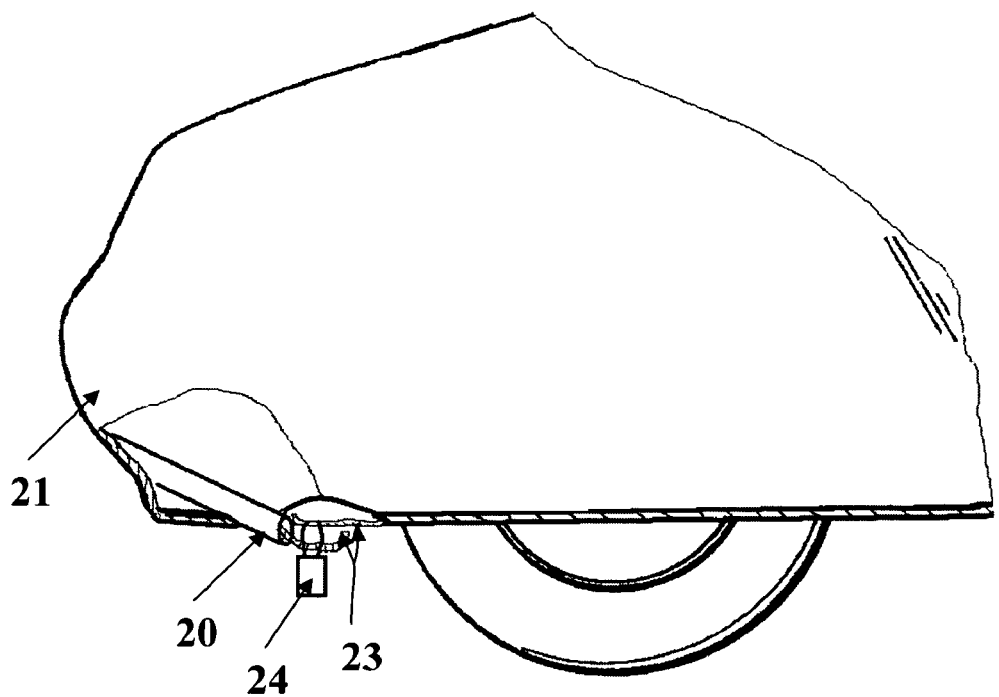
FIG. 8 is a partial perspective view of a handle element attached to the leading edge of the cover sheet together with a chain and a lock to secure the automobile cover.

FIG. 5 is a schematic diagram illustrating the preferred embodiment of the present invention which is deployed to cover a representative automobile. FIG. 6 is a perspective view showing the second container 12, the anchored first container 11, the cover sheet 10 and a handle element 20. FIG. 7 is an enlarged partial perspective view showing the second container 12 and the anchored first container 11 in their operative positions. The handle element that has a length of at least half the width of the automobile body is adapted for the user to extract the flexible cover sheet from the anchored first container, to direct the cover sheet to cover an automobile, to direct the cover sheet to uncover the automobile, and also to secure the automobile cover. In one preferred embodiment, the hand element 20 has a pipe form and its length is adjustable. For the deployment of the cover, the user grasps the handle element 20 to extract the cover 10 from the anchored container 11 without the need of unstowing or unfolding the cover. The user can then manually pull the cover 10 using the handle element 20 forwardly from one side of the automobile to correctly position the cover over the surface of the automobile. The handle element 20 is secured under the front bumper region 21 of the automobile using a lock device so as to secure the automobile cover. The automobile cover sheet 10 of the preferred embodiment is constructed of a lightweight and strong nylon material or other flexible weatherproof synthetic and natural materials, including nylon, cotton, and blends of natural and synthetic materials. The generally rectangular cover sheet 10 can be of any color although a light color on its outer side and a dark color on its inner side are preferred to reflect the sunlight away and to absorb heat radiation. The flexible cover sheet 10 has a leading edge that is attached to the handle element 20, a trailing edge that is attached to the first container 11, and side edges 22 of a suitable dimension to fit over the entire automobile body from the rear bumper 14 to the front bumper 21 and sides thereof. The length of the cover sheet 10 is adjustable by having a front end portion releasably connectable to the handle element 20 to overcome the problem of varied car length. The length of the handle element 20 needs adjustment only during the first time of use. A chain or a rope 23 made from relatively heavy metallic or non-metallic material is attached to the perimeters of the cover sheet 10. The heavy cover perimeters causes the cover sheet to naturally fall to cover the car body, which helps positioning the edge of the opening of the cover about the outer perimeter of the automobile. FIG. 8 is a schematic diagram illustrating the preferred embodiment of the present invention which provides a security mechanism. One terminal of the chain 23 passes through the handle element pipe 20 to tie up to another terminal of the chain 23 by a lock 24. This security mechanism would prevent the cover from thieves and from strong wind.

Figure 9:
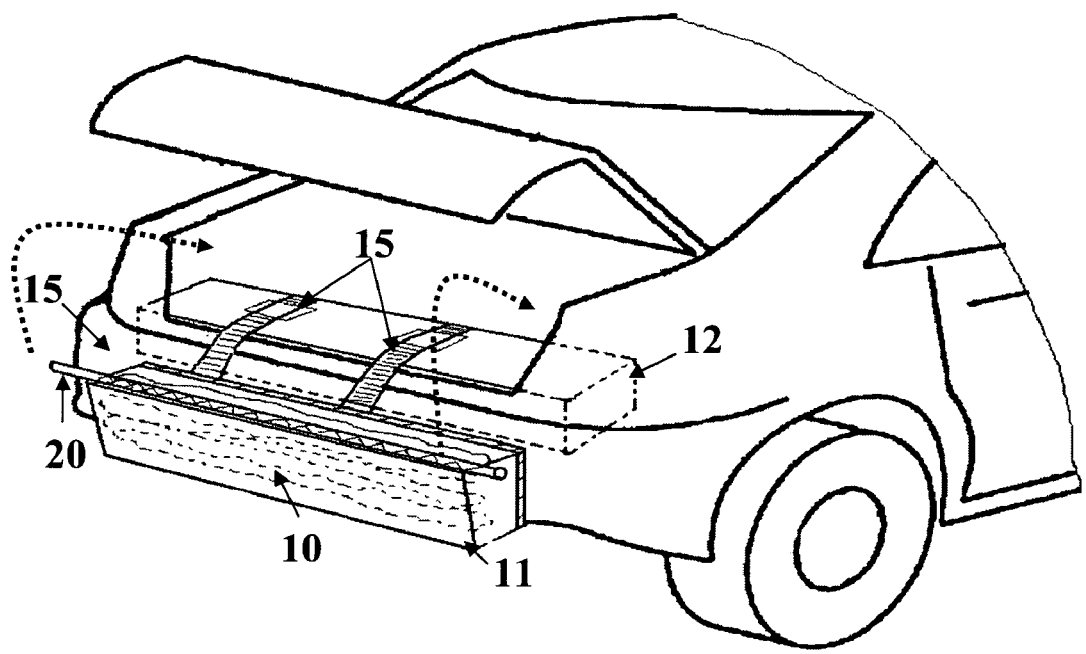
FIG. 9 is a schematic diagram illustrating the preferred embodiment of the present invention which is being swung inwardly for storage within the second container in the trunk compartment.

The uncovering of the automobile can also be quickly done. The user can easily unlock and disengage the handle element 20 from the automobile and then grasps the handle element 20 and walks rearwardly along one side of the automobile. The cover sheet can then be easily collected and stuffed into the first container 11. The trunk is then opened, the first container 11 dropped into the second container 12, and the trunk closed. FIG. 9 is a schematic diagram illustrating the preferred embodiment of the present invention which is being swung back and placed in the second container 12 for storage. The entire apparatus is compactly stowable entirely within the trunk. In uncommon cases that the trunk needs to be used to store excessive amount of luggage, the cover apparatus can be easily shifted and temporarily stored on car seats or other places.

One embodiment of the invention is that small knobs are attached to the first container 11 so as to make it easier to carry the first container out from or into the second container. Another embodiment of the invention is that the second container 12 is placed within the rear bumper 14 of the automobile, avoiding the use of trunk.

Although the foregoing description of the preferred embodiment of the present invention has described the fundamental novel features of the invention, it will be understood that various omissions, substitutions and changes in the form of the detail of the apparatus as illustrated as well as the uses thereof, may be made by those skilled in the art without departing from the spirit of the present invention. Consequently, the scope of the invention should not be limited to the foregoing discussion, but should be defined by the appended claims.

I claim:

1. An automobile cover apparatus comprising:
   a flexible cover sheet of a generally rectangular shape with a size suitable for covering the automobile so as to protect the automobile;
   a first container that is sized to stow the flexible cover in a free-folded form;
   a second container that is sized to store the first container in its storage position, and that is secured inside the automobile's trunk compartment in its operative position so as to anchor the first container via straps;
   a handle element with a length of at least half the width of the automobile is adapted for the user to extract the flexible cover sheet from the anchored first container, to direct the cover sheet to cover the automobile, to direct the cover sheet to uncover the automobile, and also to secure the automobile cover.

2. The automobile cover apparatus of claim 1, wherein the flexible cover sheet has a relatively heavy perimeter with a chain or rope attached so as to allow the cover sheet's edges to fall naturally around the automobile's body and to help position the cover.

3. The automobile cover apparatus of claim 1, wherein the first container has a length similar to the width of the automobile's trunk opening; wherein the first container has a container opening made of inflexible materials so as to ensure convenience in the storage and also the deployment of the cover sheet.

4. The automobile cover apparatus of claim 1, wherein the first container has holes at its bottom or on its sides so as to allow water or snow on the free-folded cover sheet to drop through to the second container for collection and disposal.

5. The automobile cover apparatus of claim 1, wherein the first container has a soft side that acts as a protective layer to prevent the first container from damaging the finish of the automobile after the first container is repeatedly rested on the rear bumper of the automobile.

6. The automobile cover apparatus of claim 1, wherein the second container is placed and secured within the automobile's trunk by anchoring to the edges of the trunk; wherein the second container is connected to the first container via straps so as to anchor the first container to the automobile.

7. The automobile cover apparatus of claim 1, wherein the handle element is a pipe through which a terminal of a chain or rope that is attached to the cover perimeters passes to tie up to another terminal of the chain or rope by a lock so as to lock up the automobile cover.

8. A method of covering an automobile quickly comprising the steps of:
   opening the automobile's trunk and taking a first container out from the trunk;
   anchoring the first container via straps to a second container that is secured inside the trunk compartment of the automobile;
   grasping a handle element to extract a flexible cover sheet from the anchored first container;
   pulling the cover sheet and walking forward along one side of the automobile to correctly position the cover sheet over the automobile;
   securing the handle element under the automobile's front bumper region using a lock device.

9. A method of uncovering an automobile quickly comprising the steps of:
   unlocking and disengaging a handle element from the automobile;
   grasping the handle element and walking rearward along one side of the automobile;
   collecting and stuffing a flexible cover sheet into a first container in a free form;
   opening the automobile's trunk, dropping the first container inside a second container and closing the trunk.

* * * * *